(12) United States Patent
Peterson

(10) Patent No.: US 11,576,308 B2
(45) Date of Patent: Feb. 14, 2023

(54) AGRICULTURAL BALER WITH ROLLS HAVING OVERLAPPING EXTENSIONS

(71) Applicant: CNH Industrial America LLC, New Holland, PA (US)

(72) Inventor: C. Brandon Peterson, West Grove, PA (US)

(73) Assignee: CNH Industrial America LLC, New Holland, PA (US)

( * ) Notice: Subject to any disclaimer, the term of this patent is extended or adjusted under 35 U.S.C. 154(b) by 403 days.

(21) Appl. No.: 16/801,889

(22) Filed: Feb. 26, 2020

(65) Prior Publication Data
US 2021/0259155 A1  Aug. 26, 2021

(51) Int. Cl.
*A01F 15/07* (2006.01)
*A01F 15/18* (2006.01)
*A01F 15/08* (2006.01)
*A01F 15/10* (2006.01)

(52) U.S. Cl.
CPC ............ *A01F 15/07* (2013.01); *A01F 15/085* (2013.01); *A01F 15/106* (2013.01); *A01F 15/18* (2013.01); *A01F 2015/077* (2013.01); *A01F 2015/079* (2013.01); *A01F 2015/186* (2013.01)

(58) Field of Classification Search
CPC .......... A01F 2015/077; A01F 2015/079; A01F 2015/186; A01F 15/07; A01F 15/18
See application file for complete search history.

(56) References Cited

U.S. PATENT DOCUMENTS

| 4,172,354 | A | 10/1979 | Vermeer et al. |
| 4,198,804 | A | 4/1980 | Konekamp et al. |
| 4,510,741 | A * | 4/1985 | Campbell ............... A01F 15/07 100/88 |
| 4,870,812 | A | 10/1989 | Jennings et al. |
| 6,655,121 | B1 | 12/2003 | Viesselmann et al. |
| 6,820,542 | B1 * | 11/2004 | Truitt ...................... A01F 15/07 15/4 |
| 10,080,331 | B2 | 9/2018 | Dutertre et al. |
| 2010/0115911 | A1 * | 5/2010 | Smith ..................... A01F 15/07 100/88 |
| 2017/0118919 | A1 | 5/2017 | Tenbult |

* cited by examiner

*Primary Examiner* — Adam J Eiseman
*Assistant Examiner* — Bobby Yeonjin Kim
(74) *Attorney, Agent, or Firm* — Peter Zacharias; Patrick Sheldrake

(57) ABSTRACT

A roll assembly, which may be included in an agricultural baler, includes: a first roll having a first roll surface with a plurality of first extensions extending therefrom, the first extensions defining a first rotation path when rotated; and a second roll having a second roll surface with a plurality of second extensions extending therefrom, the second extensions defining a second rotation path when rotated. The first roll and the second roll are disposed adjacent to one another such that the first rotation path and the second rotation path partially overlap. At least one roll driver is coupled to at least one of the first roll or the second roll and configured to rotate the first roll and the second roll in the rotation direction such that the first extensions and the second extensions do not collide with each other during rotation of the first roll and the second roll.

17 Claims, 4 Drawing Sheets

AGRICULTURAL BALER WITH ROLLS HAVING OVERLAPPING EXTENSIONS

BACKGROUND OF THE INVENTION

The present invention pertains to agricultural balers and, more specifically, to agricultural balers that include multiple rolls.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting unit, a main baling chamber for forming a bale, and a wrapping mechanism for wrapping or tying a material around the bale after it has been formed in the main baling chamber. As the baler is towed over a windrow, the pickup unit lifts the crop material into the baler. Then, the crop material may be cut into smaller pieces by the cutting unit. As the crop material enters the main baling chamber, multiple carrier elements, e.g. rolls, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

What is needed in the art is a way to reduce the risk of crop material loss from an agricultural baler.

SUMMARY OF THE INVENTION

Exemplary embodiments provided according to the present disclosure include a roll assembly with rolls that are configured to rotate in the same direction and include extensions that have overlapping rotation paths and do not collide with one another during rotation.

In some exemplary embodiments provided in accordance with the present disclosure, a roll assembly for an agricultural baler includes: a first roll having a first roll surface and a plurality of first extensions extending from the first roll surface, the first roll defining a first rotation axis and the first extensions defining a first rotation path when rotated about the first rotation axis in a rotation direction; a second roll having a second roll surface and a plurality of second extensions extending from the second roll surface, the second roll defining a second rotation axis and the second extensions defining a second rotation path when rotated about the second rotation axis in the rotation direction, the first roll and the second roll being disposed adjacent to one another such that the first rotation path and the second rotation path partially overlap; and at least one roll driver coupled to at least one of the first roll or the second roll and configured to rotate the first roll and the second roll in the rotation direction such that the first extensions and the second extensions do not collide with each other during rotation of the first roll and the second roll.

In some exemplary embodiments provided in accordance with the present disclosure, an agricultural baler includes: a chassis; a pickup carried by the chassis and configured to pick up crop material; and a baling chamber carried by the chassis and configured to received picked up crop material. The baling chamber includes a roll assembly. The roll assembly includes: a first roll having a first roll surface and a plurality of first extensions extending from the first roll surface, the first roll defining a first rotation axis and the first extensions defining a first rotation path when rotated about the first rotation axis in a rotation direction; a second roll having a second roll surface and a plurality of second extensions extending from the second roll surface, the second roll defining a second rotation axis and the second extensions defining a second rotation path when rotated about the second rotation axis in the rotation direction, the first roll and the second roll being disposed adjacent to one another such that the first rotation path and the second rotation path partially overlap; and at least one roll driver coupled to at least one of the first roll or the second roll and configured to rotate the first roll and the second roll in the rotation direction such that the first extensions and the second extensions do not collide with each other during rotation of the first roll and the second roll.

One possible advantage that may be realized by exemplary embodiments provided according to the present disclosure is that the extensions having overlapping rotation paths can increase the aggressiveness of the rolls and assist in forming the core of a bale.

Another possible advantage that may be realized by exemplary embodiments provided according to the present disclosure is that the proximity of the rolls to one another can reduce the risk of crop material uncontrollably migrating out of the baling chamber.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
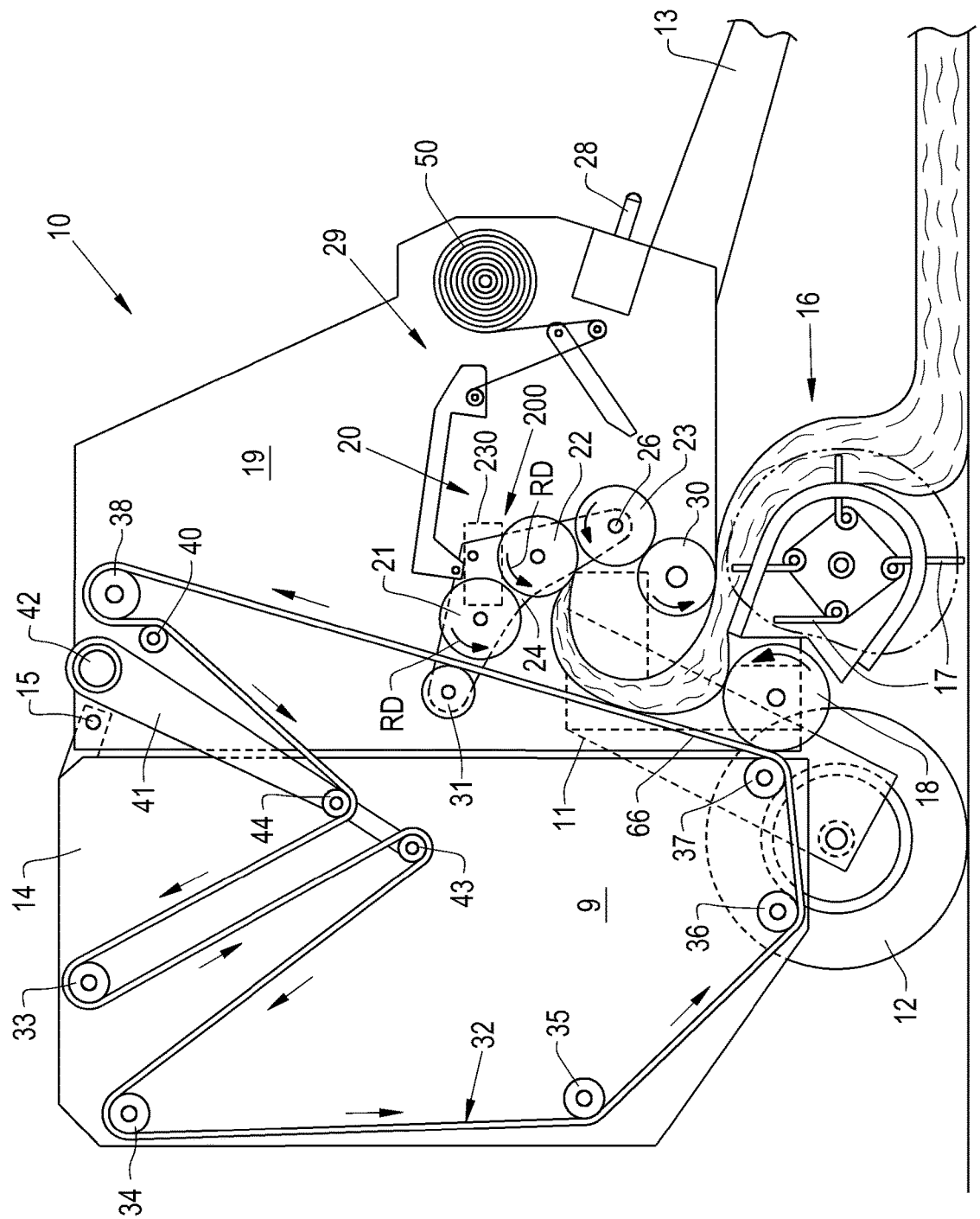
FIG. 1 illustrates a side sectional view of an exemplary embodiment of an agricultural baler including a roll assembly, provided in accordance with the present disclosure.

Referring now to the drawings, and more particularly to FIG. 1, an exemplary embodiment of a rotary or round baler 10 is illustrated having an expandable chamber defined in part by belts and rolls, as disclosed in U.S. Pat. No. 4,870,812, which is incorporated herein by reference. Baler 10 has a chassis 11, carrying a pair of side walls 19 (only one side wall is shown), supported by a pair of wheels 12 (only one wheel 12 shown). As used herein, a rotary or round baler 10 is a baler that produces a substantially cylindrical bale having a substantially round or circular cross section. A forwardly mounted tongue 13 is provided on chassis 11 for connection to a tractor. Pivotally connected to a side wall 19 by a pair of stub shafts 15 is a tailgate 14 which is closed during bale formation. A pickup 16, carried by chassis 11, includes tines 17 movable in a predetermined path to lift crop material from the ground and deliver it to a floor roll 18, rotatably mounted on chassis 11.

An expandable baling chamber 9 for forming bales is defined partly by a sledge assembly 20 comprising a roll assembly 200 including transversely extending bale-forming rolls 21, 22, 23 journalled at their ends in a pair of spaced arms 24, one of which is shown. These arms 24 are pivotally mounted on stub shafts 26 for providing movement of sledge assembly 20. Rolls 21, 22, 23 are driven in a rotation direction, illustrated as being counter-clockwise, by one or more roll drivers 230 (which may include, for example, chains and sprockets) coupled to a drive shaft 28. The drive shaft 28 may be, for example, a power take-off. A starter roll 30, mounted on chassis 11, is also driven counter-clockwise. A freely rotatable idler roll 31, carried by arms 24, moves in an arcuate path with sledge assembly 20.

Net wrapping apparatus 29 is mounted between side walls 19 on chassis 11 and sledge assembly 20 forwardly of the bale forming chamber. Net is dispensed from a supply or net roll 50 to the chamber via an opening between rolls 22 and 23.

The baling chamber 9 is further defined by an apron 32 comprising a plurality of continuous side-by-side belts supported by guide rolls 33, 34, 35, 36, 37 rotatably mounted in tailgate 14. Apron 32 is also supported by drive roll 38, mounted on chassis 11. Although apron 32 passes between roll 21 and idler roll 31, it is in engagement only with idler roll 31 and not roll 21. A suitable coupler connected to drive shaft 28 provides rotation of drive roll 38, causing movement of apron 32 in the directions indicated by the arrows in FIG. 1. An additional guide roll 40 ensures proper engagement between apron 32 and drive roll 38. A pair of take-up arms 41 (only one shown) is pivotally mounted on chassis 11 by a cross shaft 42 for movement between inner, intermediate and outer positions. Take-up arms 41, which carry additional guide rolls 43, 44 for supporting apron 32, are resiliently urged toward their inner positions.

When the elements of round baler 10 are disposed as shown in FIG. 1, an inner course 66 of apron 32 extends between guide roll 37 and idler roll 31 to form the rear wall of the core starting chamber 9, while the inwardly facing surfaces of rolls 21, 22, 23 define, in a general manner, a rearwardly inclined front wall. Floor roll 18 defines the bottom of the chamber, and with starter roll 30, provides an inlet for crop material.

When round baler 10 travels across a field, pickup tines 17 pickup crop material from the ground and convey it through the inlet. The crop material is conveyed by floor roll 18 into engagement with apron inner course 66 which urges the crop material upward and forward into engagement with the rolls on sledge assembly 20. In this manner, crop material is coiled in a clockwise direction to start a bale core. Continued feeding of crop material into the chamber by pickup tines 17 causes apron inner course 66 to expand in length around a portion of the circumference of the bale core as the diameter increases. Take-up arms 41 rotate from their inner position toward their outer position to accommodate expansion of the inner course 66 of the apron in a well-known manner. After a bale has been formed and wrapped, tailgate 14 is opened and the bale is ejected rearwardly.

During bale formation, sledge assembly 20 moves between a bale-starting position to a full bale position. This movement causes idler roll 31 to move in an arcuate path while maintaining apron 32 in close proximity to roll 21, thereby allowing roll 21 to strip crop material from the belts and prevent or reduce significantly the loss of crop material between roll 21 and apron 32 during bale formation. Sledge assembly 20 is pushed outward towards its full bale position during bale formation as the crop material expands against rolls 21, 22, 23 and then subsequently is pulled inward by apron 32.

In known balers, the rolls that form the bale are slightly spaced apart from each other. The clearance between the rolls allows the rolls to rotate without interfering with the rotation of other rolls. In some balers, the rolls carry extensions, such as ribs, to increase the aggressiveness of the bale formation. While this increased aggressiveness has been found to assist in core formation, it has also been found that the increased aggressiveness can lead to crop material uncontrollably migrating out of the baling chamber. The uncontrollable migration of crop material not only reduces the amount of crop material that is baled, but can also accelerate wear and tear on components of the baler.

Figure 2:
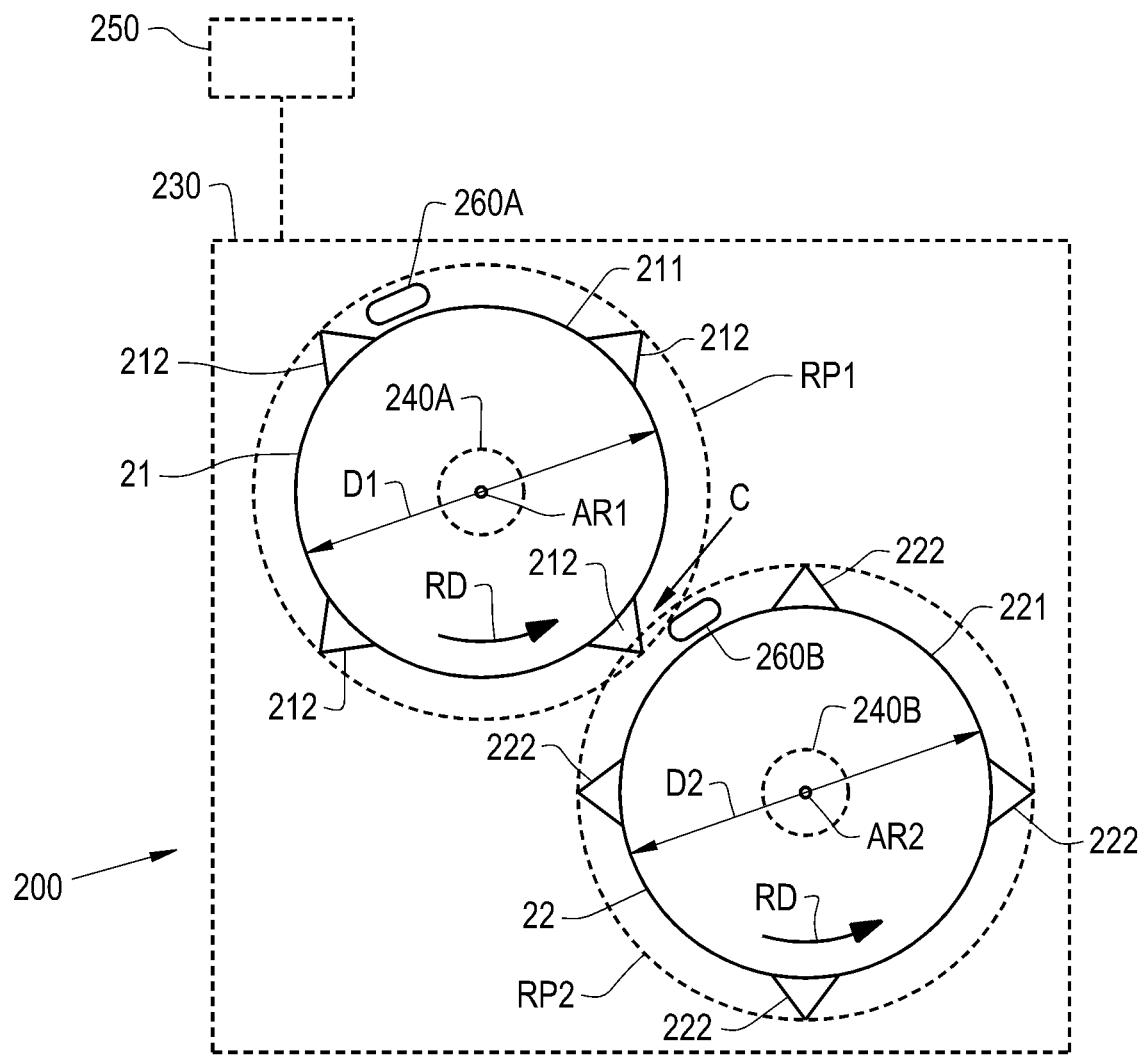
FIG. 2 illustrates a close-up side view of the roll assembly illustrated in FIG. 1.

To address some of the previously described issues, and referring now to FIG. 2, the roll assembly 200 includes a first roll, such as the previously described roll 21, and a second roll, such as the previously described roll 22. The first roll 21 includes a first roll surface 211 with a plurality of first extensions 212, which may be ribs (as illustrated) or other types of extensions, extending therefrom. The first roll 21 defines a first rotation axis AR1 about which the first roll 21 is configured to rotate in a rotation direction RD. The first roll 21 also defines a first diameter D1. The first extensions 212 define a first rotation path, illustrated as circular region RP1, when rotated about the first rotation axis AR1 in the rotation direction RD. In this respect, the first rotation path RP1 represents the space surrounding the first roll 21 where the first extensions 212 travel through during a full rotation of the first roll 21 about the first rotation axis AR1.

Similarly, the second roll 22 includes a second roll surface 221 with a plurality of second extensions 222, which may also be ribs or other types of extensions, extending therefrom. The second roll 22 defines a second rotation axis AR2 about which the second roll 22 is configured to rotate in the rotation direction RD, i.e., the second roll 22 is configured to rotate in the same rotation direction RD as the first roll 21. The second roll 22 also defines a second diameter D2, which may be equal to the first diameter D1 of the first roll 21. The second extensions 222 define a second rotation path, illustrated as circular region RP2, when rotated about the second rotation axis AR2 in the rotation direction RD. Similarly to the first rotation path RP1, the second rotation path RP2 represents the space surrounding the second roll 22 where the second extensions 222 travel through during a full rotation of the second roll 22 about the second rotation axis AR2.

As can be appreciated from FIG. 2, the rolls 21, 22 are disposed adjacent to one another such that the first rotation path RP1 of the first extensions 212 and the second rotation path RP2 of the second extensions 222 partially overlap. Each respective rotation path RP1, RP2 may, for example, overlap a significant portion of a clearance C between the rolls 21, 22 so the extensions 212, 222 fill a significant portion of the clearance C during rotation. As can be appreciated from FIG. 2, in some embodiments the rolls 21, 22 do not contact one another as, for example, a set of gears would.

By including the extensions 212, 222, the aggressiveness of the rolls 21, 22 can be increased to improve the core forming ability of the roll assembly 200. Further, overlapping the first rotation path RP1 and the second rotation path RP2 reduces the amount of unoccupied space in the clearance C between the rolls 21, 22 during operation. Reducing the amount of unoccupied space helps to reduce the amount of uncontrolled crop material migration in the baler 10 by limiting the size of gaps between the rolls 21, 22; gaps between the rolls 21, 22 provide opportunities for crop material to escape through and migrate within the baler 10. Thus, disposing the rolls 21, 22 adjacent to one another with the rotation paths RP1, RP2 partially overlapped can increase the aggressiveness of the rolls 21, 22 while also reducing the amount of crop material that uncontrollably migrates in the baler 10.

At least one roll driver, illustrated as a single roll driver 230 in FIG. 2, is coupled to the first roll 21 and/or the second roll 22 and configured to rotate the first roll 21 and the second roll 22 in the rotation direction RD. While the roll driver 230 is previously described as including chains and sprockets coupled to the drive shaft 28 in order to transmit mechanical rotary power to the rolls 21, 22, in some embodiments the roll driver 230 converts, for example, electrical or hydraulic power into rotary power, which is provided to the rolls 21, 22. The roll driver 230 may be, for example, an electrically and/or hydraulically powered motor and, in some embodiments, may include a gearbox coupled to the drive shaft 28 and/or the rolls 21, 22. Further, while only one roll driver 230 is illustrated and described further herein, in some embodiments there are a plurality of roll drivers to rotate the rolls 21, 22, e.g., two roll drivers may be provided and each roll 21, 22 may be coupled to a respective one of the roll drivers. The roll driver 230 is configured such that the first extensions 212 and the second extensions 222 do not collide with each other during rotation of the first roll 21 and the second roll 22. In other words, the roll driver 230 is configured to rotate both rolls 21, 22 in such a manner that the extensions 212, 222 of the rolls 21, 22 do not collide in the region where the rotation paths RP1, RP2 overlap.

In the embodiment illustrated in FIG. 2, for example, the first extensions 212 are equally spaced from one another about the first roll surface 211 and the second extensions 222 are equally spaced from one another about the second roll surface 221, with the number of first extensions 212 and the number of second extensions 222 each being four, i.e., the number of first extensions 212 and the number of second extensions 222 may be equal. To rotate the rolls 21, 22 so the extensions 212, 222 do not collide, the roll driver 230 may be configured to rotate the rolls 21, 22 in the rotation direction RD at the same rotational speed. When the rolls 21, 22 have the same diameters D1, D2 and rotate in the same rotation direction RD at the same rotational speed, the extensions 212, 222 will not collide during rotation as long as the extensions 212, 222 are not in contact upon reaching the same rotational speed. It should be appreciated that the roll driver 230 can rotate the rolls 21, 22 in other ways so the extensions 212, 222 do not collide during rotation, and the previously described way is just one example.

To reduce the risk of damage to either roll 21, 22 and/or the roll driver 230 in the event that there is a malfunction and the extensions 212, 222 do collide, a shear pin 240A, 240B may be coupled to the first roll 21 and/or the second roll 22. The coupled shear pin 240A, 240B is configured to cause free-wheeling, i.e., low-resistance rotation, of the respectively coupled roll 21, 22 upon shearing. For example, the shear pins 240A, 240B may each couple their respective roll 21, 22 to the roll driver 230. If the extensions 212, 222 collide during rotation, this can cause shearing of one or both of the shear pins 240A, 240B, uncoupling the respective roll 21, 22 from the roll driver 230. The uncoupled roll(s) 21, 22 may then free-wheel, which can prevent significant damage to the roll(s) 21, 22 and the roll driver 230. In such a case, only the sheared shear pin 240A, 240B, which is a relatively simple and inexpensive part, requires replacement to repair the roll assembly 200. Thus, the one or more shear pins 240A, 240B can provide an inexpensive failsafe to reduce the risk of significant damage in the event that the extensions 212, 222 collide during rotation.

In some embodiments, the baler 10 includes a controller 250 that is operably coupled to the roll driver 230 and configured to output a driver signal to the roll driver 230. The output driver signal causes the roll driver 230 to rotate the first roll 21 and the second roll 22. In some embodiments, the output driver signal controls the rotation speed and the rotation direction RD of the rolls 21, 22. In some embodiments, the controller 250 is operatively coupled to one or more rotation sensors 260A, 260B configured to output a respective rotation speed signal to the controller 250. Each of the rotation sensors 260A, 260B may be associated with a respective roll 21, 22 to output a rotation speed signal corresponding to the rotation speed of the respective roll 21, 22. The controller 250 may be configured to receive the rotation speed signals and, based upon the received rotation speed signals, determine the driver signal that is output to the roll driver 230. If, for example, the controller 250 is configured to control the roll driver 230 so the rolls 21, 22 rotate at the same rotation speed, the controller 250 may be configured to determine if the rotation speed of each roll 21, 22 differs, based on the received rotation speed signal, and output a corrective driver signal to the roll driver 230 responsively to determining that the rotation speed differs. Alternatively, if the roll driver 230 is configured to rotate the rolls 21, 22 at different rotation speeds, the controller 250 may be configured to output driver signals that adjust the rotation speed of each individual roll 21, 22 so the extensions 212, 222 do not collide during rotation. In this respect, the controller 250 may be configured in a variety of ways to control the roll driver 230 so the extensions 212, 222 do not collide during rotation. It should be appreciated that the previously described ways of the controller 250 controlling the roll driver 230 are exemplary only, and other ways may be utilized according to the present disclosure.

Figure 3:
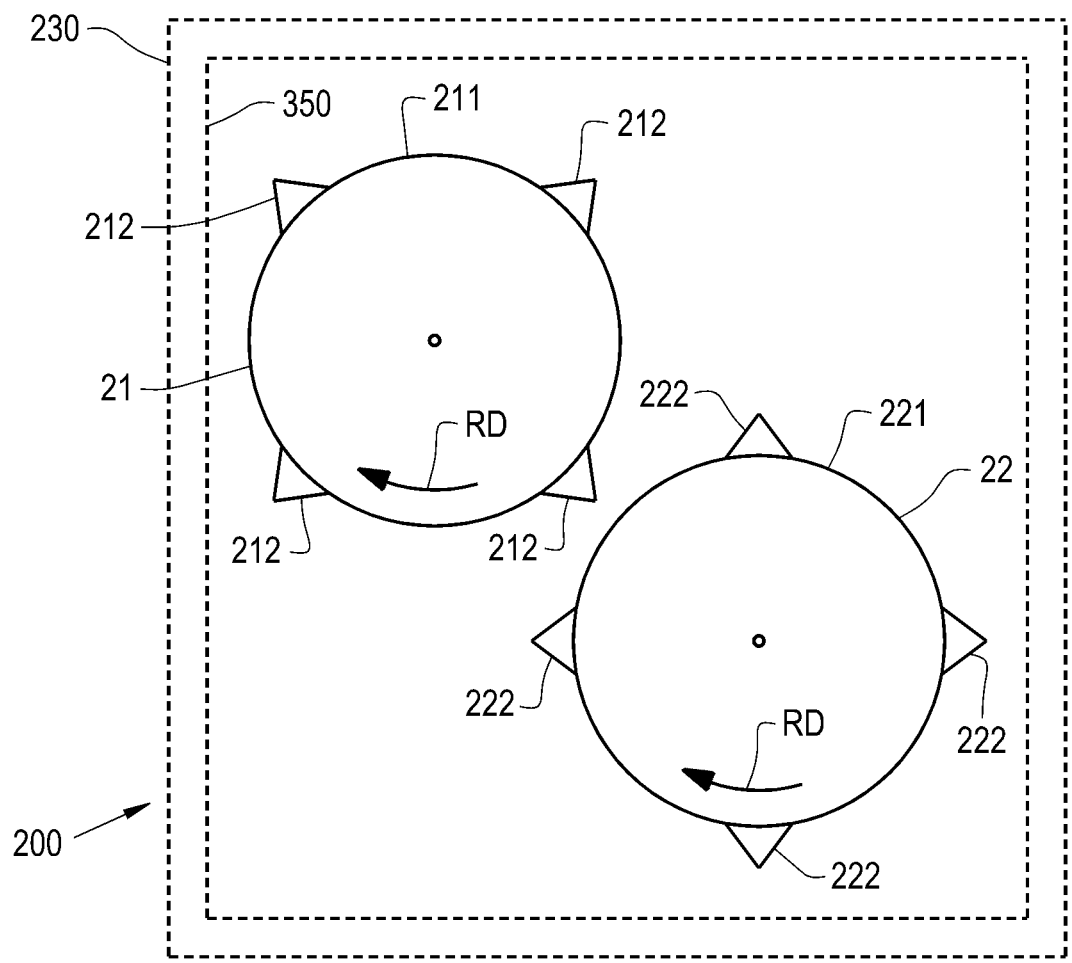
FIG. 3 illustrates a close-up side view of the roll assembly of FIG. 2 provided with a linkage, in accordance with the present disclosure.
Figure 4:
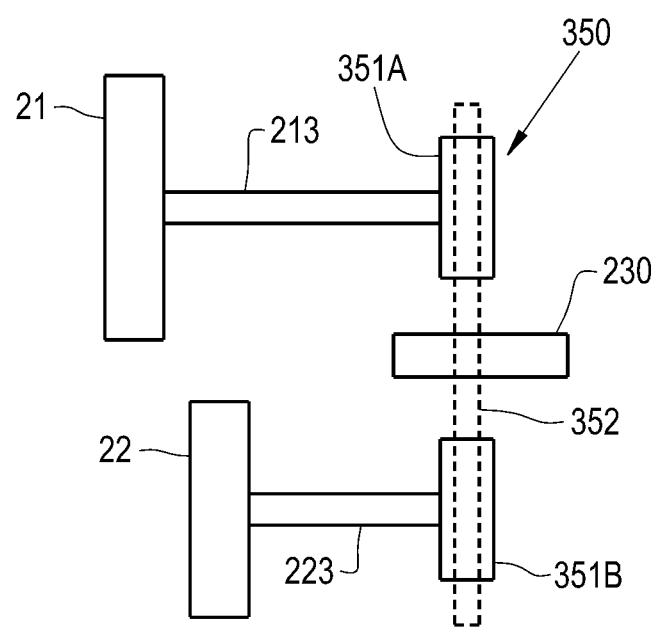
FIG. 4 is a schematic view of the roll assembly of FIG. 3.

In some embodiments, and referring now to FIGS. 3 and 4, a linkage 350 is provided that couples both the first roll 21 and/or the second roll 22 to the one or more roll drivers 230. The linkage 350 may include, for example, sprockets 351A, 351B and a chain 352 that transmit rotary power from the roll driver 230 to one or both of the rolls 21, 22. In some embodiments, the linkage 350 couples to both rolls 21, 22 and the roll driver 230. As illustrated in FIGS. 3-4, for example, each of the sprockets 351A, 351B of the linkage 350 may be driven by the roll driver 230 via the chain 352 and couple to a respective input 213, 223 of the rolls 21, 22. The inputs 213, 223 may be, for example, stub shafts that are each coupled to a respective roll 21, 22. Rotation of the sprockets 351A, 351B thus drives rotation of the rolls 21, 22. The sprockets 351A, 351B may each be the same size so the sprockets 351A, 351B are each rotated at the same rotation speed by the chain 352, which can also result in the rolls 21, 22 rotating at the same rotation speed. The inputs 213, 223 of the rolls 21, 22 may, for example, couple directly to the sprockets 351A, 351B so the rolls 21, 22 rotate at the same rotational speed as the sprockets 351A, 351B. However, it should be appreciated that the illustrated and described linkage 350 is exemplary only and many different types of linkages may be utilized according to the present disclosure to rotate the rolls 21, 22 in a desired way.

From the foregoing, it should be appreciated that the roll assembly 200 provided according to the present disclosure allows for aggressive formation of the bale core while reducing the risk of crop material uncontrollably migrating throughout the baler 10. The extensions 212, 222 having overlapping rotation paths RP1, RP2 can reduce the number and size of gaps that are available for crop material to migrate through. Further, the roll driver 230 can be controlled in a variety of ways to rotate the rolls 21, 22 so the extensions 212, 222 do not collide with each other.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A roll assembly for an agricultural baler, comprising: a first roll comprising a first roll surface and a plurality of first extensions extending from the first roll surface, the first roll defining a first rotation axis and the first extensions defining a first rotation path when rotated about the first rotation axis in a rotation direction; a second roll comprising a second roll surface and a plurality of second extensions extending from the second roll surface, the second roll defining a second rotation axis and the second extensions defining a second rotation path when rotated about the second rotation axis in the rotation direction, the first roll and the second roll being disposed adjacent to one another such that the first rotation path and the second rotation path partially overlap; and at least one roll driver coupled to at least one of the first roll or the second roll and configured to rotate the first roll and the second roll in the rotation direction such that the first extensions and the second extensions do not collide with each other during rotation of the first roll and the second roll; and a shear pin coupled to at least one of the first roll or the second roll and configured to cause free-wheeling of the respectively coupled roll upon shearing.

2. The roll assembly of claim 1, wherein the first roll defines a first diameter and the second roll defines a second diameter that is equal to the first diameter.

3. The roll assembly of claim 1, wherein the first roll surface and the second roll surface do not contact one another.

4. The roll assembly of claim 1, wherein the at least one roll driver is configured to rotate the first roll and the second roll at the same rotational speed.

5. The roll assembly of claim 1, further comprising a linkage coupling at least one of the first roll or the second roll to the at least one roll driver.

6. The roll assembly of claim 5, wherein the first roll and the second roll are both coupled to the at least one roll driver through the linkage.

7. The roll assembly of claim 1, further comprising a controller operably coupled to the at least one roll driver, the controller being configured to output a driver signal to the at least one roll driver to cause the at least one roll driver to rotate the first roll and the second roll.

8. The roll assembly of claim 1, wherein the first extensions are equally spaced from one another about the first roll surface and the second extensions are equally spaced from one another about the second roll surface.

9. An agricultural baler, comprising: a chassis; a pickup carried by the chassis and configured to pick up crop material; and a baling chamber carried by the chassis and configured to received picked up crop material, the baling chamber comprising a roll assembly, the roll assembly comprising: a first roll comprising a first roll surface and a plurality of first extensions extending from the first roll surface, the first roll defining a first rotation axis and the first extensions defining a first rotation path when rotated about the first rotation axis in a rotation direction; a second roll comprising a second roll surface and a plurality of second extensions extending from the second roll surface, the second roll defining a second rotation axis and the second extensions defining a second rotation path when rotated about the second rotation axis in the rotation direction, the first roll and the second roll being disposed adjacent to one another such that the first rotation path and the second rotation path partially overlap; and at least one roll driver coupled to at least one of the first roll or the second roll and configured to rotate the first roll and the second roll in the rotation direction such that the first extensions and the second extensions do not collide with each other during rotation of the first roll and the second roll.

10. The agricultural baler of claim 9, wherein the first roll defines a first diameter and the second roll defines a second diameter that is equal to the first diameter.

11. The agricultural baler of claim 9, wherein the first roll surface and the second roll surface do not contact one another.

12. The agricultural baler of claim 9, wherein the at least one roll driver is configured to rotate the first roll and the second roll at the same rotational speed.

13. The agricultural baler of claim 9, further comprising a linkage coupling at least one of the first roll or the second roll to the at least one roll driver.

14. The agricultural baler of claim 13, wherein the first roll and the second roll are both coupled to the at least one roll driver through the linkage.

15. The agricultural baler of claim 9, further comprising a controller operably coupled to the at least one roll driver, the controller being configured to output a driver signal to the at least one roll driver to cause the at least one roll driver to rotate the first roll and the second roll.

16. The agricultural baler of claim 9, further comprising a shear pin coupled to at least one of the first roll or the second roll and configured to cause free-wheeling of the respectively coupled roll upon shearing.

17. The agricultural baler of claim 9, wherein the first extensions are equally spaced from one another about the first roll surface and the second extensions are equally spaced from one another about the second roll surface.

* * * * *